United States Patent [19]

Schievelbein

[11] 4,165,785

[45] Aug. 28, 1979

[54] SURFACTANT WATER FLOODING OIL RECOVERY PROCESS

[75] Inventor: Vernon H. Schievelbein, Houston, Tex.

[73] Assignee: Texaco Inc., White Plains, N.Y.

[21] Appl. No.: 863,506

[22] Filed: Dec. 22, 1977

[51] Int. Cl.$^2$ ............................................. E21B 43/22
[52] U.S. Cl. .................................... 166/274; 166/273; 252/8.55 D
[58] Field of Search .................. 252/8.55 D; 166/273, 166/274, 275

[56] References Cited

U.S. PATENT DOCUMENTS

| | | | |
|---|---|---|---|
| 3,294,164 | 12/1966 | Hardy et al. | 166/274 |
| 3,358,758 | 12/1967 | Hardy et al. | 166/274 |
| 3,866,680 | 2/1975 | Dauben | 166/273 |
| 3,888,308 | 6/1975 | Gale et al. | 252/8.55 X |
| 3,977,471 | 8/1976 | Gale et al. | 252/8.55 X |
| 4,018,278 | 4/1977 | Shupe | 166/274 X |

*Primary Examiner*—Herbert B. Guynn

*Attorney, Agent, or Firm*—Carl G. Ries; Thomas H. Whaley; Jack H. Park

[57] ABSTRACT

The amount of oil recoverable from a subterranean, petroleum-containing, permeable formation by surfactant water flooding is improved if at least two separate slugs of surfactant-containing fluid are injected into the formation, the first being a fluid containing a surfactant which is an effective emulsifier for the petroleum in the formation and the second surfactant fluid containing a surfactant which does not produce an emulsion between the aqueous fluid and the formation petroleum, but which is effective for achieving maximum oil recovery, or for achieving the minimum interfacial tension between the aqueous phase present in the flow channels of the formation and the formation petroleum. In one embodiment, both surfactants are an aliphatic (e.g. alkyl) or alkylarylpolyalkoxyalkyl sulfonate, differing only in the average number of alkoxy groups per molecule. The first emulsifying surfactant contains an average of from 0.2 to 0.8 fewer alkoxy groups than the second surfactant.

5 Claims, No Drawings

SURFACTANT WATER FLOODING OIL RECOVERY PROCESS

BACKGROUND OF THE INVENTION

1. Field of the Invention

This invention pertains to a process for supplemental oil recovery, and more particularly it pertains to an improved surfactant water flooding supplemental oil recovery process. Still more particularly, this invention pertains to a surfactant water flooding supplemental oil recovery process employing at least two distinct surfactant fluids, the first fluid injected into the formation containing an emulsifying surfactant and the second fluid containing a surfactant which produces a minimum interfacial tension between the aqueous fluid and the formation petroleum, and which produces essentially no emulsion.

2. Background of the Invention

It is well recognized by persons skilled in the art of oil recovery techniques that only a fraction of the amount of oil or petroleum originally present in a petroleum reservoir can be recovered by primary production, e.g., by allowing the oil to flow to the surface of the earth as a consequence of naturally occuring energy forces, or by so called secondary recovery which comprises injecting water into a formation by one or more wells to displace petroleum toward one or more spaced-apart production wells, from which it is recovered to the surface of the earth. Although water flooding is an inexpensive supplemental oil recovery process, water does not displace oil effectively even in those portions of the formation through which it passes, because water and oil are immiscible and the interfacial tension between water and oil is quite high. This too has been recognized by persons skilled in the art of oil recovery, and many surface active agents or surfactants have been proposed for incorporation in the water flood for the purpose of reducing the interfacial tension between the injected aqueous fluid and the formation petroleum, thereby recovering substantially more of the petroleum present in the portion of the formation through which the injected aqueous fluid passes than is possible for simple water flooding alone. Petroleum sulfonate has been utilized for this purpose, and many references in the prior art disclose the use of petroleum sulfonate. Petroleum sulfonate, however, suffers from a serious limitation, namely that it is not effective in the presence of relatively high salinity water, e.g., water whose salinity exceeds about 20,000 parts per million total dissolved solids, and so other types of surfactants must be employed if the surfactant will contact water having salinities greater than the above stated figure.

A particularly promising surfactant for use in oil recovery processes involving surfactant water flooding is an alkyl- or alkylarylpolyalkoxy (usually polyethoxy) alkyl sulfonate. The surfactant can be utilized in the presence of very high salinity brines, up to at least 240,000 parts per million total dissolved solids, and additionally can be employed safely in formations having relatively high temperatures, e.g., as high as 250° F. (121.1° C.). The use of alkyl- or alkylarylpolyalkoxylalkyl sulfonates in surfactant water flooding processes is described in the following U.S. Pat. Nos.: 3,827,497-Dycus et al; 3,890,239-Dycus et al; 3,977,471-Gale et al; and 4,018,278-Shupe.

Despite the existance of a substantial amount of prior art describing the use of surfactant water flooding oil recovery processes for recovering increased amounts of petroleum from subterranean formations over that recoverable by the use of water flooding alone, little commercial use has been made of surfactant water flooding processes because the amount of additional petroleum recovered thereby has not been sufficient to justify the high cost of surfactants necessary for use in these processes.

In view of the foregoing discussion, and particularly in view of the serious current shortage of petroleum, it can be appreciated that there is a significant need for a supplemental oil recovery process by means of which increased amounts of petroleum may be obtained from the known petroleum formations. More specifically, there is a substantial need for an improved surfactant water flooding supplemental oil recovery process which will recover significantly greater amounts of petroleum while employing an economically acceptable amount of surfactant.

SUMMARY OF THE INVENTION

I have discovered an improved surfactant water flooding supplemental oil recovery process, particularly one employing as the only surfactant or as a component in the surfactant fluid, an aliphatic or alkylarylpolyalkoxyalkyl sulfonate having the following formula:

$$R\text{-}(OR')_n\text{-}R''SO_3M$$

wherein R is an aliphatic, preferably an alkyl, linear or branched, having from 9 to 25 and preferably from 12 to 18 carbon atoms, or an alkylaryl group such as benzene, toluene or xylene having attached thereto at least one alkyl group, linear or branched, having from 9 to 15 and preferably from 10 to 13 carbon atoms; R' is ethylene or a mixture of ethylene and higher molecular weight alkylene with relatively more ethylene than higher molecular weight alkylene; n is a number including fractional numbers from 2 to 10 and preferably from 3 to 7; R" is ethylene, propylene, hydroxy propylene, or butylene and M is a monovalent cation such as sodium, potassium, lithium or ammonium. In applying the process of my invention, at least two separate surfactant fluids are injected sequentially into the formation. The first surfactant fluid employs a surfactant which produces a significant amount, preferably the surfactant capable of producing the maximum amount, of an emulsion containing the formation petroleum and the aqueous fluid e.g. brine, present in the flow channels. In lab tests performed for the purpose of identifying the preferred emulsifying surfactant, the volume of emulsion formed should be at least 5% and preferably 40% based on the initial volume of surfactant solution. The second surfactant fluid employs a surfactant which produces essentially no emulsion phase between the formation petroleum and the aqueous fluid present in the formation, but which exhibits the optimum effectiveness for the purpose of oil recovery, which may be identified by determining the particular surfactant which reduces the interfacial tension between the formation petroleum and the aqueous fluid present in the flow channels of the formation to a value less than 100 and preferably less than 20 millidynes/centimeter. In the preferred embodiment, in which the sole surfactant or one of the surfactants present in each fluid is an aliphatic or alkylarylpolyalkoxyalkyl sulfonate, the surfactants employed in the two fluids will usually differ only in the average number of moles of ethylene oxide per mole of surfactant. Ordinarily the surfactant contained in the first surfactant fluid injected into the formation will contain from 0.2 to 0.8 fewer moles of alkylene oxide (e.g. ethylene oxide) per mole of surfactant than the surfactant employed in the second fluid injected into the subterranean formation. The preferred surfactants may be identified by determining which surfactant achieves the desired low interfacial tension between formation petroleum and the aqueous fluid present in the flow channels of the formation, and employing that surfactant in the second surfactant fluid. The surfactant used in the first surfactant fluid may be a similar alkyl or alkylarylpolyalkoxyalkyl sulfonate differing from the second only in that it contains on average from 0.2 to 0.8 fewer moles of alkylene oxide (e.g. ethylene oxide) per mole of surfactant than the surfactant employed in the second fluid. Alternatively, the surfactant capable of producing the maximum amount of emulsion between the formation petroleum and the aqueous fluid present in the formation is identified directly and is utilized as the surfactant in the first surfactant fluid. The surfactant in the second surfactant fluid contains an average of from 0.2 to 0.8 more moles of alkylene oxide per mole of surfactant than the surfactant of the first fluid. Finally, in another embodiment the surfactant identified as being the one capable of producing the maximum amount of emulsion is utilized in the first fluid, and the surfactant which is identified directly as the one which produces the minimum interfacial tension is utilized in the second fluid. The amount of oil recovered when these fluids are injected as described above is significantly greater than that which is obtained if a single quantity of fluid equivalent to the total amounts of the two fluids injected in the process of my invention, is injected containing either of the two above mentioned surfactants above, or containing a mixture thereof. Moreover, very poor results are obtained if the first surfactant fluid injected contains the surfactant which produces the minimum interfacial tension, and the second fluid contains the emulsifying surfactant, e.g., the same fluids described above but in the reverse order to that disclosed above.

DESCRIPTION OF THE PREFERRED EMBODIMENTS

Briefly, the process of my invention is an improvement in a surfactant water flooding supplemental oil recovery process. In its simplest terms, the process of my invention involves injecting at least two separate surfactant-containing fluids into the subterranean, petroleum-containing formation. The fluid fluid will contain one or more surfactants which are quite effective for producing an emulsion between the petroleum present in the formation and the aqueous fluid, e.g., the natural formation brine, present in the formation flow channels. The second fluid injected into the formation contains a surfactant which produces no emulsion phase between the formation petroleum and the aqueous fluid present in the formation flow channels, and which additionally is optimally effective for low surface tension oil displacement, or which produces very low interfacial tension between the formation petroleum and the aqueous fluid present in the formation flow channels, e.g. which produces an interfacial tension between these fluids at least less than about 100 millidynes/centimeter.

In a preferred embodiment, one and preferably both of the fluids injected into the formation contains an aliphatic (e.g. alkyl) or alkylarylpolyalkoxyalkyl sulfonate of the following formula:

$$R\text{-}(OR')_n\text{-}R''SO_3M$$

wherein R is an aliphatic, preferbly an alkyl, linear or branched, having from 9 to 25 and preferably from 12 to 18 carbon atoms, or an alkylaryl group such as benzene, toluene or xylene having attached thereto at least one alkyl group, linear or branched, containing from 9 to 15 and preferably from 10 to 13 carbon atoms; R' is ethylene or a mixture of ethylene and higher molecular weight alkylene with relatively more ethylene than higher molecular weight alkylene; n is a number including fractional numbers, from 2 to 10 and preferably from 3 to 7; R" is ethylene, propylene, hydroxy propylene, or butylene, and M is a monovalent cation such as sodium, potassium, lithium or ammonium. The above described alkyl or alkylarylpolyalkoxyalkyl sulfonate may be essentially the only surfactant present in either or both of the surfactant fluids, or it may be present in combination with other surfactants such as organic sulfonates including petroleum sulfonate, in which case the alkyl or alkylarylpolyalkoxyalkyl sulfonate solubilizes the organic sulfonate in the particular brine fluid present in the formation. The alkyl or alkylarylpolyalkoxyalkyl sulfonate of either or both fluids may be used in combination with a nonionic surfactant having the following formula:

$$R(OR')_nOH$$

wherein R, R' and n have the same meanings as above. The ratio of nonionic to the sulfonate surfactant in this embodiment is from 0.05 to 0.50. A preferred embodiment of the present invention involves the use of alkyl or alkylarylpolyalkoxyalkyl sulfonate as essentially the only surfactant in each of the two fluids injected into the formation. The principal difference, and usually the only difference between the alkyl or alkylaryl polyalkoxyalkyl sulfonate utilized in the first fluid and that utilized in the second fluid, is the average number of alkoxy groups present in the surfactant utilized in the two fluids. Ordinarily, the alkyl or alkylarylpolyalkoxyalkyl sulfonate employed in the first fluid will contain from 0.2 to 0.8 fewer moles of alkoxy, which is usually ethoxy, per mole of surfactant than the second surfactant.

In determining the precise surfactants for use in each fluid, several approaches may be employed. The surfactant which produces the maximum amount of emulsion, or which produces at least a significant amount of emulsion, is identified in simple tests preferably utilizing the precise petroleum present in the formation and a sample of brine present in the formation where the fluid is to be injected. In tests performed for the purpose of identifying the preferred emulsifying surfactant, the volume of emulsion formed should be at least 5% and preferably at least 40% of the initial volume of surfactant solution. A precise method of identifying preferred surfactant will be described more fully hereinafter below. Once the particular alkyl or alkylarylpolyalkoxyalkyl sulfonate which produces an optimum amount of emulsion is identified, an otherwise similar surfactant but containing from 0.2 to 0.8 and preferably from 0.3 to 0.6 more moles of ethylene oxide per mole of surfactant is employed as the surfactant in the second surfactant fluid. For example, if it is determined that a particular effective surfactant for forming an emulsion between a sample of petroleum and field brine is a dodecylbenzenepolyethoxypropane sulfonate containing an average of 2.8 moles of ethylene oxide per mole of surfactant, then this surfactant is employed in the first fluid and the second fluid will contain a dodecylbenzenepolyethoxypropane sulfonate containing an average of from about 3.0 to about 3.6 moles of ethylene oxide per mole of surfactant.

In a slightly different embodiment, a particularly effective alkyl or alkylarylpolyalkoxyalkyl sulfonate for achieving low interfacial tension between the formation petroleum and the aqueous fluid, e.g., formation brine, present in the formation flow channels, is identified. This may be accomplished by obtaining a series of alkyl or alkylaryl polyalkoxyalkyl sulfonates differing only in the number of alkylene oxide groups per mole, measuring the interfacial tension achieved between the formation petroleum and fluids containing these different samples, and identifying the surfactant which achieves the minimum interfacial tension, which should be less than 100 and preferably less than 20 millidynes/centimeter, and using the identified surfactant species in the second fluid. Once the optimum surfactant for use in the second fluid is identified, the surfactant contained in the first fluid is preferably an otherwise identical alkyl or alkylarylpolyalkoxyalkyl sulfonate differing from the surfactant utilized in the second fluid only in that the average number of moles of alkylene oxide per mole of surfactant is from 0.2 to 0.8 and preferably from 0.3 to 0.6 fewer than the averge number of alkylene oxide groups of the surfactant employed in the second surfactant fluid. For example, if it is determined that the minimum interfacial tension obtained in a series of tests employing samples of field brine and crude oil is 18 millidynes per centimeter, using 2.0% dodecylbenzenepolyethoxypropane sulfonate containing an average of 3.3 moles of ethylene oxide per mole of surfactant, this is the surfactant employed in the second fluid and the first fluid contains a like concentration of dodecylbenzenepolyethoxypropane sulfonate containing from 2.5 to 3.1 and preferably from 2.7 to 3.0 moles of ethylene oxide per mole of surfactant.

A third method for identifying the two preferred surfactants for use in the two fluids employed in the process of my invention, involves the same determinations as are listed above, in which case the alkyl or alkylarylpolyalkoxyalkyl sulfonate which is most effective for producing an emulsion is utilized in the first fluid, and the alkyl or alkylarylpolyalkoxyalkyl sulfonate which produces no emulsion and which achieves the desired low interfacial tension as is identified directly by interfacial tension measurements, is employed in the second fluid. Although the results may be the same as are obtained in the first two methods for identifying the preferred surfactants described above, the third method is slightly more flexible and more precise and additionally permits the use of two surfactants which are not identical but for the number of alkylene oxide groups per molecule, e.g., which may have slightly different oil soluble groups (R in the above formula), different linking groups (R" in the above formula) etc.

While I have identified the preferred surfactants for use in the two fluids which will be injected separately into the oil containing formation in the process of my invention, by the use of tests wherein it is indicated that the surfactant which produces at least the desired amount of emulsion is identified for the first fluid, and the surfactant which produces the desired low interfacial tension is identified for use in the second fluid, obviously the precise species which produces the maximum emulsion and the minimum interfacial tension need not be utilized in order to achieve the benefits of my invention. For example, in identifying the surfactant to be employed in the first fluid of my invention, if one surfactant is identified which produces five percent less of an emulsion phase than another, either may be utilized in the process of my invention in the first fluid, so long as the emulsion phase is at least 5% of the initial surfactant volume since it is only necessary that the first fluid be one which produces a significant amount of emulsion. By significant amount of emulsion it is meant that when an aqueous fluid containing the surfactant and formation petroleum are mixed the ratio of emulsion phase to the total volume of solution should be at least 0.2 and preferably greater than 0.3. Spontaneous emulsification or formation of a microemulsion is not required. All that is required is that formation of a distinct, creamy-appearing emulsion phase.

Similarly, it is not necessary that the precise surfactant which produces the minimum interfacial tension be identified, for the purpose of selecting the surfactant to be employed in the second fluid injected into the petroleum formation according to the process of my invention. It is only necessary that a surfactant which produces essentially no emulsion between the aqueous fluid and the formation petroleum, and which reduces the interfacial tension between petroleum and the aqueous fluid containing the surfactant to a value less than 100 and preferably less than 20 millidynes per centimeter should be identified and utilized in the second fluid. Obviously, either of two surfactants which achieves within a few percentage points of the same interfacial tension may be utilized in the second fluid with equivalent results.

The volume of the first and second fluids injected into the formation will ordinarily be from 0.02 to 0.40 and preferably from 0.05 to 0.25 pore volumes based on the pore volume of the formation to be exploited in application of the process of my invention.

The concentration in each surfactant within the two fluids employed in the process of my invention will primarily be from 0.1 to 5.0 and preferably from 0.5 to 3.0 percent by weight (1 to 50 and preferably 5 to 30 kilograms per meter$^3$).

Other additives as are commonly employed in surfactant water flooding, including substances which reduce surfactant adsorption, or which increase the viscosity of the fluids for improved sweep efficiency, etc., may be used in either or both of the above-described surfactant fluids, or in separate slugs of fluid injected before or after the slugs of surfactant injected according to the process of my invention.

The method of applying the process of my invention and the results obtainable therefrom will be more readily understood by reference to the following examples, which are offered only for the purpose of additional disclosure and are not intended to be in any way limitative or restrictive of the scope of my invention, which will be defined solely by the claims appended hereinafter below.

All of the tests described more fully below relate to the use of dodecylbenzenepolyethoxyhydroxypropane sulfonate, with the number of moles of ethylene oxide per moles of surfactant varying from 2.6 to 3.4. Petroleum used in all of the tests involved crude oil obtained from a formation under consideration for surfactant water-flooding. Field water from the same formation was also obtained, and it was determined that the salinity of this fluid was about 85 kilograms/meter$^3$ (85,000 parts per million) total dissolved solids. In all of the tests described below, the concentration of surfactant was 10 kilograms/meter$^3$ (1.0 percent by weight).

A series of emulsification tests were conducted. These tests comprised mixing together 5 cc's of oil and 30 cc's of the one percent surfactant solution in the 85 kilogram/meter$^3$ (85,000 parts per million) brine. The solutions were heated to a temperature about equal to the temperature of a particular formation being studied, 43° C. (109° F.) and gently agitated over an eight hour period. The solutions were then allowed to equilibrate for several days, and the volume of emulsion phase and total volume of fluid including the emulsion, petroleum and aqueous phases, were observed. The figures reported in Table I below under volume ratio represents the volume of emulsion phase divided by the total volume of fluid, including emulsion and separate phases of the field brine and any unemulsified oil that may have been present.

TABLE I

| Run | Average number of moles of ethylene oxide per mole of surfactant[1] | Emulsification volume ratio volume of emulsion ÷ total fluid volume |
|---|---|---|
| A | 2.6 | 0.02 |
| B | 2.8 | 0.39 |
| C | 3.0 | 0.02 |
| D | 3.2 | 0.00 |
| E | 3.4 | 0.00 |

[1]The surfactants used were all dodecylbenzenepolyethoxyhydroxypropane sulfonate differing only in the number of moles of ethylene oxide.

From the foregoing data in Table I above, it can be seen that the optimum emulsification effect of five samples tested was the one containing 2.8 moles of ethylene oxide per mole of surfactant, which produced a volume ratio of 0.39. It can also be seen that of the samples containing relatively more ethylene oxide and which produced no emulsification, the optimum reduction in interfacial tension was achieved using the samples containing 3.2 moles of ethylene oxide per mole of surfactant. Thus, based on the above data, a preferred embodiment according to the process of my invention comprises injecting first an aqueous solution containing the 2.8 mole ethylene oxide sample and thereafter injecting a separate quantity of surfactant fluid containing a 3.2 mole ethylene oxide sample.

A series of oil displacement tests were performed utilizing limestone cores, whose permeabilities were in the range of from 20 to 30 millidarcies, which were flooded with various quantities of surfactant fluid dissolved in the same field brine as discussed above, and at a temperature about equal to formation temperature which is 43° C. (109° F.). In all cases, the surfactant fluid was followed by a viscous water flood, specifically several pore volumes of Kelzan ® polysaccharide, a commonly used hydrophilic polymer, in order to ensure a favorable mobility ratio in displacing the surfactant fluid through the formation. Approximately 15 kilograms/meter$^3$ (1.5% by weight) Lignosite 458 ®, a lignosulfonate was included in each surfactant fluid. Additionally, 0.1 pore volume of brine was injected between the surfactant fluid and the Kelzan mobility drive fluid in order to effect separation between the two fluids.

In the first oil displacement test, designated Run F in the data contained in Table II below, it can be seen that 0.5 percent pore volume of a 1 percent solution of the 3.0 mole ethylene oxide surfactant recovered 54 percent of the tertiary oil, e.g., the oil remaining in the core after it had been water flooded. In Run G, a slightly smaller, 0.35 pore volume percent slug of essentially the same surfactant fluid as was used in Run F recovered substantially less tertiary oil, only 37 percent of the oil remaining in the core after water flooding. Run H represented a two step process according to the procedure of my invention, in which first a 0.2 pore volume slug containing 1 percent of the 2.8 mole ethylene oxide surfactant was injected into the core, followed immediately by a 0.2 pore volume slug containing 1 percent of sample D, the 3.2 mole ethylene oxide sample. It can be seen that Run H recovered more tertiary oil than Run F, even though less total pore volumes of surfactant fluid was utilized, clearly indicating the advantage obtained as a result of first injecting an aqueous surfactant solution containing an emulsifying form of the alkylbenzenepolyethoxyhydroxypropane sulfonate followed by a 0.2 pore volume slug containing 1 percent by weight of the related surfactant which was non-emulsifying, but interfacial tension reducing, which contained approximately 3.2 moles of ethylene oxide per mole of surfactant. It can be appreciated that the cost for chemicals in Run H would be less than for Run F, since less total volume of solution was utilized and since materials are similar except for the slight difference in the number of moles of ethylene oxide per mole of surfactant. In terms of a large field application, the amount of additional oil recovered would be a very significant volume, and it would actually be accomplished utilizing a smaller cost for chemicals than one employing a single large slug of essentially the same surfactants.

TABLE II

| | OIL RECOVERY EFFECTIVENESS | | | |
|---|---|---|---|---|
| Run | Process Pore Volumes of Fluid | Concentration of Surfactant | Moles of ethylene oxide per mole of Surfactant | % Tertiary Oil Recovery |
| F | 0.5 | 1% | 3.0 | 54% |
| G | 0.35 | 1% | 3.0 | 37% |
| H | (1)0.2 | 1% | 2.8 | 57% |
| | (2)0.2 | 1% | 3.2 | |

All surfactants used above were sodium dodecylbenzene sulfonate.

The mechanism responsible for the benefits obtained in employing the process of my invention are not totally understood. The cores employed in the surfactant flooding tests were relatively homogeneous cores obtained from an oil formation, and although the process described herein does improve the vertical conformance when applied to a petroleum formation containing two or more layers of substantially different permeabilities, that situation is clearly not present in the tests described herein since the cores were homogeneous. It is believed that the improved response in applying the process of my invention to a relatively uniform formation or portion thereof is achieved as a result of the effect of the emulsifying surfactant on the pressure differential developed across certain capillary flow channels within the formation matrix, which alters the flow displacement characteristic of a subsequently injected low interfacial tension surfactant oil-displacing fluid. It is not necessarily hereby represented that this is in fact the only mechanism or even the principle mechanism responsible for the benefits noted above, however, and it is not intended that my invention be in any way limited by this description of the mechanism responsible for the benefits achieved which is presented only for the purpose of complete disclosure.

While my invention has been described in terms of a number of illustrative embodiments, it is clearly not so limited since many variations thereof will be apparent to persons skilled in the related art without departing from the true spirit and scope of my invention, and it is my desire and intention that my invention be limited only by those limitations and restrictions as appear in the claims appended immediately hereinafter below.

I claim:

1. A method for recovering petroleum from a subterranean, petroleum-containing permeable formation, said formation being penetrated by at least one injection well and by at least one spaced-apart production well, both wells being in fluid communication with the formation, comprising (a) injecting a first surfactant fluid containing from 0.1 to 5.0 percent by weight of an alkylpolyalkoxyalkylene sulfonate or alkylarylpolyalkoxyalkylene sulfonate having the following formula:

$$R\text{-}(OR')_n\text{-}R''SO_3M$$

wherein R is an alkyl having from 9 to 25 carbon atoms, or an alkylaryl group selected from the group consisting of benzene, toluene and xylene having attached thereto at least one alkyl group having from 9 to 15 carbon atoms; R' is ethylene or a mixture of ethylene and higher molecular weight alkylene with relatively more ethylene than higher molecular weight alkylene; n is a number from 2 to 10; R" is ethylene, propylene, hydroxy propylene, or butylene and M is sodium, potassium, lithium or ammonium, wherein the value of n is selected so as to produce a fluid capable of forming at least 5% by volume of the surfactant fluid of emulsion with the formation petroleum;

(b) thereafter injecting an aqueous surfactant fluid containing from 0.1 to 5.0 percent by weight of a second alkylpolyalkoxyalkylene sulfonate or alkylarylpolyalkoxyalkylene sulfonate having the following formula:

$$R_a(OR_a')_{na}R_a''SO_3M_a$$

wherein $R_a$, $R_a'$ and $R_a''$ have the same meaning as R, R' and R" above; $M_a$ is sodium, potassium, lithium or ammonium na is a number from 2 to 10; wherein the value of na is chosen so the surfactant produces essentially no emulsion and reduces the interfacial tension between petroleum and the aqueous fluid present in the formation to a value less than about 100 millidynes per centimeter;

(c) said surfactant fluids displacing petroleum through the formation toward the production well; and (d) recovering petroleum displaced by said surfactant fluid from the formation via the production well.

2. A method as recited in claim 1 wherein the second surfactant fluid achieves an interfacial tension less than 20 millidynes per centimeter.

3. A method of recovering petroleum from a subterranean, petroleum-containing formation, said formation being penetrated by at least one injection well and by at least one spaced-apart production well, both wells being in fluid communication with the formation, comprising (a) injecting a first surfactant-containing aqueous fluid into the formation;

(b) thereafter injecting a second surfactant-containing aqueous fluid into the formation;

(c) both of said surfactant fluids containing from 0.1 to 5.0 percent by weight of an alkylpolyalkoxyalkylene sulfonate or alkylarylpolyalkoxyalkylene sulfonate having the following formula:

$$R\text{-}(OR')_n\text{-}R''SO_3M$$

wherein R is an alkyl, having from 9 to 25 carbon atoms, or an alkylaryl selected from the group consisting of benzene, toluene and xylene having attached thereto at least one alkyl containing from 9 to 15 carbon atoms; R' is ethylene or a mixture of ethylene and higher molecular weight alkylene with relatively more ethylene than higher molecular weight alkylene; n is a number from 2 to 10; R" is ethylene, propylene, hydroxy propylene, or butylene and M is sodium, potassium, lithium or ammonium, wherein the value of n of the surfactant in the first surfactant fluid injected is chosen so the surfactant produces at least 5% by volume of the surfactant fluid of emulsion with the formation petroleum, and the value of n of the surfactant in the second surfactant fluid is from 0.3 to 0.8 greater than the value of n of the surfactant contained in the first surfactant fluid said second surfactant fluid producing essentially no emulsion and reducing the interfacial tension between the petroleum and the aqueous fluid persent in the formation to a value less than 100 millidynes per centimeter, the R group being essentially the same in the first and second surfactant;

(d) said surfactant fluids displacing petroleum through the formation toward the production well; and (e) recovering petroleum displaced by said surfactant fluids from the formation via the production well.

4. A method as recited in claim 3 wherein the volume of emulsion produced is at least 40 percent of the volume of surfactant fluid.

5. A method as recited in claim 3 wherein the value of n in the second surfactant is from 0.3 to 0.6 greater than the value of n in the first surfactant.

* * * * *